United States Patent
Gilbert

[11] 3,805,733
[45] Apr. 23, 1974

[54] SHIFT INDICATOR ARRANGEMENT
[75] Inventor: Robert E. Gilbert, Flint, Mich.
[73] Assignee: General Motors Corporation, Detroit, Mich.
[22] Filed: Aug. 25, 1972
[21] Appl. No.: 283,641

[52] U.S. Cl............. 116/124 R, 74/475, 240/1 EL
[51] Int. Cl............................................... G09f 9/00
[58] Field of Search......... 116/124 R, 133, DIG. 20, 116/129 L; 240/1 EL, 2.1, 8.16; 74/473, 475; 29/400

[56] References Cited
UNITED STATES PATENTS
2,159,095   5/1939   Madan ........................... 116/129 L
2,410,064   10/1946  Hardesty ........................ 116/129 L
2,612,133   9/1952   Crawford ....................... 116/124 R
2,616,389   11/1952  Little et al..................... 116/129 L
2,738,755   3/1956   Doane............................ 116/124 R
2,898,880   8/1959   Newton, Sr...................... 240/2.1 X
2,925,061   2/1960   Thornburgh et al............... 116/124 R
3,625,179   12/1971  Allen, Jr. et al................ 240/1 EL
3,695,215   10/1972  Lambiris........................ 116/124 R Primary Examiner—Louis J. Capozi
Attorney, Agent, or Firm—John P. Moran

[57] ABSTRACT
The drawings illustrate a shift indicator arrangement including a housing and means for mounting and operatively retaining an indicator member therein without benefit of any screws or fasteners as have been required heretofore.

3 Claims, 4 Drawing Figures

PATENTED APR 23 1974          3,805,733

SHIFT INDICATOR ARRANGEMENT

This invention relates generally to automotive transmissions and, more particularly, to a shift indicator mechanism therefor.

It is desirable to provide a shift indicator arrangement which is easily assembled, eliminates fastener components, and yet is efficient in operation once assembled, while being positively retained in its various operative positions.

Accordingly, an object of the invention is to provide an improved shift indicator arrangement which satisfies the above-described characteristics.

A more specific object of the invention is to provide an improved shift indicator arrangement including a housing, an indicator member mounted in the housing such that it may be urged in one direction by a spring and pulled in the opposite direction by a cable, while being slidably mounted via camming action around a pin member and retained intermediate a base and a retainer cover, without having required the use of any screws or fasteners during the assembly process.

A further object of the invention is to provide such a shift indicator arrangement including a built-in lighting and lens arrangement wherein the light is directed through the length of the lens to thoroughly illuminate the usual shift indicator indicia and the pointer portion of the indicator member.

These and other objects and advantages of the invention will be apparent when reference is made to the following description and accompanying drawings, wherein.

Figure 1:
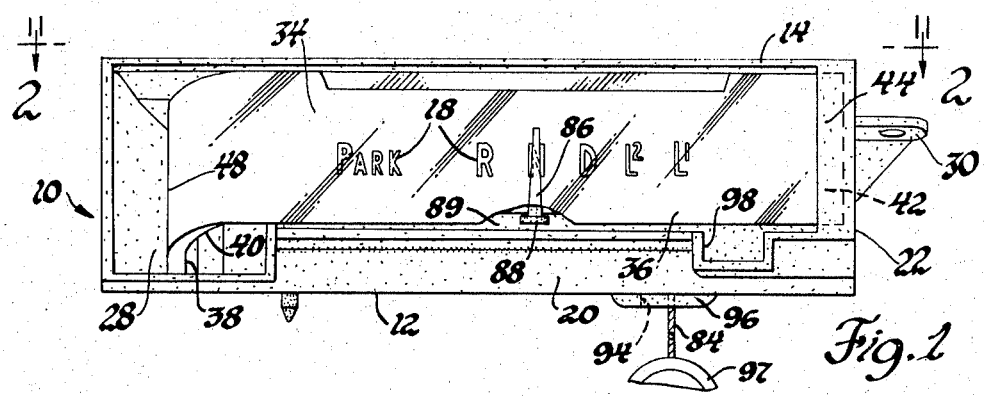
FIG. 1 is a front view of a shift indicator housing embodying the invention.
Figure 2:
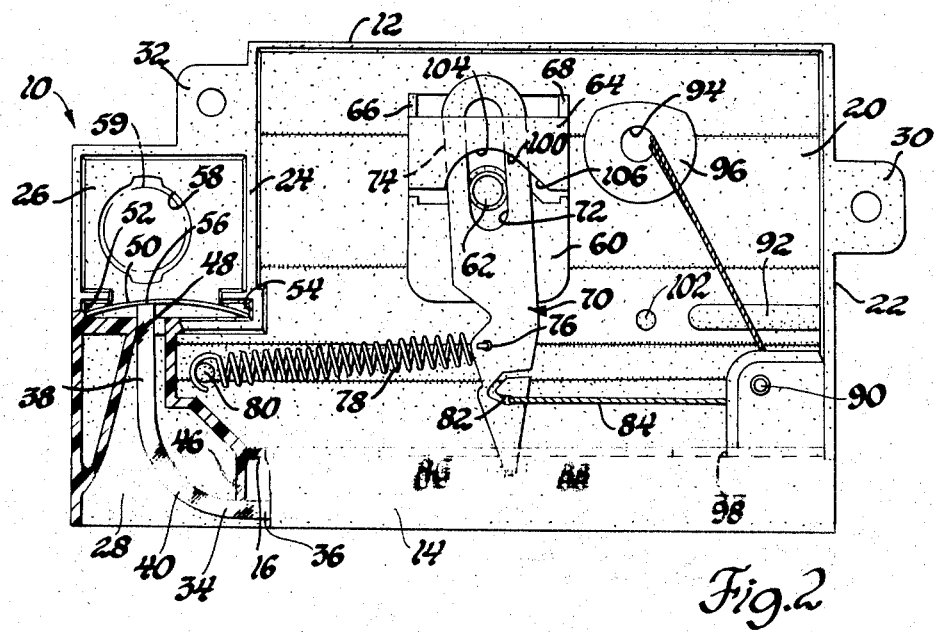
FIG. 2 is a top view taken along the plane of line 2—2 of FIG. 1, and looking in the direction of the arrows.

Referring now to the drawings in greater detail, FIGS. 1 and 2 illustrate a vehicular shift indicator assembly 10 including a housing 12 having a frontal frame portion 14 extending forwardly, i.e., toward the vehicle operator, from a front wall 16 on which shift indicator indicia 18 are formed. The housing 12 further comprises a bottom wall 20, a right side wall 22 and a left side wall 24. An open-top light compartment 26 and a lens extension compartment 28, open at the front, are formed on the bottom wall 20 exterior the left side wall 24. A pair of mounting tabs 30 and 32 are formed on the right and left side walls 22 and 24, respectively.

A transparent lens 34 of any suitable material, such as a clear plastic, includes a front laterally extending portion 36, a rearwardly extending portion 38 and an interconnecting arcuate portion 40. The front portion 36 is fitted at its extreme right-hand edge 42 behind a laterally extending vertical ledge 44 formed on the right side of the frontal frame portion 14 of the housing 12. At the point of juncture between the front portion 36 and the arcuate portion 40, the lens 34 abuts against a forwardly extending vertical ledge 46 formed on the front wall 16. The rearwardly extending portion 38 of the lens 34 abuts against a side of a necked-down portion 48 of the compartment 28. A colored plastic strip 50 is mounted at oppositely disposed edges thereof in slots 52 and 54 formed in the light compartment 26 and bowed across the rear edge 56 of the rearwardly extending lens portion 38. An opening 58 is formed in the bottom of the compartment 26, suitable for the insertion therein of a light bulb, the latter being represented generally at 59.

Looking now toward the interior of the housing 12 (FIG. 2), it may be noted that a mounting base 60 is formed on the bottom wall 20, with a cylindrical pin member 62 formed thereon and extending vertically therefrom. A retainer cover member 64 is positioned a predetermined height above the base 60, connected at the right and left edges thereof by vertical walls or strips 66 and 68 integrally formed between the base 60 and the cover member 64.

An indicator member 70 has a slot 72 formed therein for mounting around the pin member 62, with a rear portion or end 74 of the indicator member 70 being inserted or mounted intermediate the retainer cover member 64 and the mounting base 60. An opening 76 is formed at an intermediate point along the length of the indicator member 70 for the connection thereto of an end of a coil spring 78 connected at its other end to a retainer pin 80 formed on the bottom wall 20 of the housing 12. A substantially U-shaped slot or notch 82 is formed in the indicator member 70 adjacent the spring opening 76 and away from the end portion 74 thereof suitable for the connection thereto of a cable 84. As illustrated in FIG. 1, a pointer 86 is formed on the forward end 88 of the indicator member 70, the end 88 extending through a horizontal slot 89 formed along the front wall 16, and the pointer 86 extending upwardly therefrom intermediate the lens portion 36 and the front wall 16, past the indicia 18.

A post 90 is formed in a corner of the housing 12 adjacent the front and right side walls 16 and 22, respectively. The cable 84 extends from the notch 82 in the indicator member 70, around the post 90, over an abutment or projection 92 formed on the bottom wall 20, and out through an opening 94 also formed in the bottom wall 20. A doughnut-shaped raised portion 96 is formed around the opening 94 which, along with the abutment 92, retains the cable 84 spaced apart from the bottom wall 20. The cable 84, of course, is operatively connected to the usual steering column shift tube, represented generally at 97 (FIG. 1).

For purposes to be hereinafter described, an opening 98 (FIG. 1) is formed in the front wall 16, a contoured notch or opening 100 (FIG. 2) is formed in the retainer cover 64, and a pin member 102 (FIG. 2) is formed on the bottom wall 20, intermediate the opening 98 and the contoured notch 100. As shown in FIG. 2, the notch 100 includes an arcuate portion 104 and a straight portion 106.

In operation, as the cable 84 is pulled around the post 90 and through the opening 94, it may be realized from FIG. 2, that the notch 82 portion of the indicator member 70 will be pulled substantially straight across the housing 12, parallel to the front wall 16, against the force of the spring 78, causing the pointer 86 to move across the shift indicia 18 substantially parallel to the front wall 16 of the housing 12 on which the indicia 18 are formed, while the slot 72 is cammed along the fixed pin 62, with the end portion 74 of the indicator member 70 remaining under the retainer cover member 64 at all times.

When energized, the light from the light bulb 59 mounted in the light compartment 26 passes through the colored plastic strip 50 into the rear edge 56 of the lens portion 38 and is thus directed along the portion 36, around the arcuate portion 40 of the lens 34, and thence along the front laterally extending lens portion 36 to uniformly illuminate the indicia 18 and the pointer 86.

Figure 3:
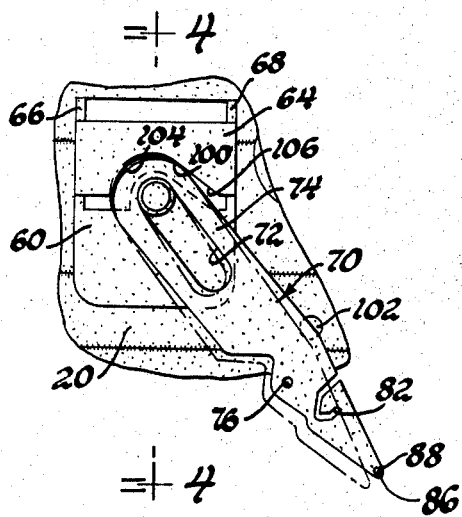
FIG. 3 is a fragmentary view of a portion of the FIG. 2 structure, illustrating the method of assembly involved therein.
Figure 4:
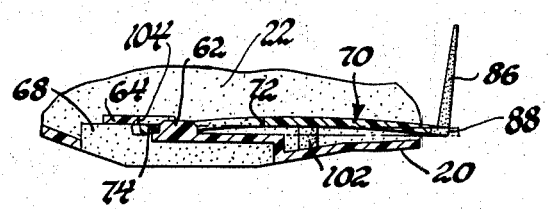
FIG. 4 is a cross-sectional view taken along the plane of line 4—4 of FIG. 3, and looking in the direction of the arrows.

Referring now to FIGS. 3 and 4, it may be noted that the method of assembly comprises first inserting the pointer 86 of the indicator member 70 through the opening 98 formed in the front wall 16 of the housing 12, then mounting the slot 72, which is formed adjacent the end 74 of the indicator member 70 opposite the pointer 86, over the pin member 62 mounted on the base 60.

As may be noted in FIG. 3, the rounded end 74 of the indicator member 70 first fits past the contoured arcuate and straight portions 104 and 106, respectively, of the notch 100 to a position intermediate the retainer cover member 64 and the mounting base 60. As illustrated in FIG. 4, at this point, the center portion of the indicator member 70 will be bowed over the pin member 102 formed on the bottom wall 20.

Next, the indicator member 70 is manually pushed to the left in FIG. 3, whereupon it snaps off of the pin member 102, causing the end portion 74 of the indicator member 70 to slip underneath the retainer cover member 64, with the slot 72 of the indicator member 70 being cammed along the pin member 62. With the pin member 102 thereafter serving as a rightward stop, the indicator member 70 remains movably mounted on the mounting base 60 of the bottom wall 20 of the housing 12, without benefit of any screws or other fasteners as have been required in prior arrangements. A leftward stop is provided by the left end (FIG. 1) of the horizontal slot 89, the end 88 of the indicator member 70 being urged thereagainst by the spring 78.

While but one embodiment of the invention has been shown and described, other modifications thereof are possible.

I claim:

1. A shift indicator arrangement comprising a housing having a flat support wall and a flat indicator wall formed at substantially right angles with said support wall, shift indicator indicia formed on said flat indicator wall, a slotted opening formed at the juncture between said support wall and said indicator wall, a base portion formed on said support wall, a first pin member formed on said base portion, second and third pin members formed on said support wall, a retainer cover secured to and spaced apart from said base portion, an indicator member having a laterally extending pointer formed on one end thereof and a longitudinal cam slot formed adjacent the other end thereof, said pointer extending through said slotted opening and adjacent said shift indicator indicia, said indicator member being mounted with said longitudinal cam slot positioned around said first pin member, a spring connected between said second pin member and said indicator member adjacent said pointer, a cable connector slot formed in said indicator member adjacent said pointer and said spring, and a cable mounted in said cable connector slot, said pointer being movable through a path substantially parallel to said flat indicator wall while said longitudinal cam slot is cammed along said first pin member in response to actuation of said cable against the force of said spring, said third pin member and an end of said slotted opening serving as oppositely disposed stops for said indicator member.

2. The shift indicator arrangement described in claim 1, and a light compartment formed on said bottom wall, suitable for the mounting therein of a light bulb; a second compartment formed adjacent said light compartment; an opening formed between said light compartment and said second compartment; a frame portion formed on said indicator wall; a lens having a first straight section extending across said indicator wall and secured in said frame portion; a second straight section extending through said second compartment and said opening and into said light compartment, and an arcuate section interconnecting said first and second straight sections, said light from said light bulb entering the extended edge of said second straight section of said lens and being dispersed along said second straight section, around said arcuate section, and through said first straight section to illuminate said indicia and said pointer.

3. A shift indicator arrangement comprising a housing having supporting wall means and indicator wall means formed at substantially right angles to one another, a slotted opening formed at the juncture between said supporting wall means and said indicator wall means, first, second and third pin members formed on said supporting wall means, said second and third pin members being positioned on opposite sides of said first pin member, a retainer cover secured to and spaced apart from said supporting wall means, an indicator member having a laterally extending pointer formed on one end thereof and a longitudinal cam slot formed adjacent the other end thereof and mounted over said first pin member with a portion of said indicator member being freely movable intermediate said retainer cover and said supporting wall means and with said pointer extending through said slotted opening and adjacent said indicator wall means, said second pin member serving as stop means for said indicator member, a coil spring connected between said indicator member and said third pin member, and a cable connected to said indicator member adapted to urge said indicator member toward said second pin member against the force of said coil spring and thereby causing said cam slot to move relative to said first pin member and said pointer to move substantially parallel to said indicator wall means.

* * * * *